United States Patent
Hsu (10) Patent No.: US 10,757,963 B2
(45) Date of Patent: Sep. 1, 2020

(54) HEAT-TRANSFORMING CERAMIC ROASTING CYLINDER AND COFFEE BEAN ROASTER USING THE SAME

(71) Applicants: Chun-Shyong Lee, New Taipei (TW); Sen-Kung Hsu, New Taipei (TW)

(72) Inventor: Sen-Kung Hsu, New Taipei (TW)

(73) Assignees: Chun-Shyong Lee, New Taipei (TW); Sen-Kung Hsu, New Taipei (TW)

(*) Notice: Subject to any disclaimer, the term of this patent is extended or adjusted under 35 U.S.C. 154(b) by 278 days.

(21) Appl. No.: 16/059,112

(22) Filed: Aug. 9, 2018

(65) Prior Publication Data

US 2020/0046009 A1    Feb. 13, 2020

(51) Int. Cl.
*A23N 12/10*    (2006.01)
*A47J 37/04*    (2006.01)
*F26B 11/02*    (2006.01)

(52) U.S. Cl.
CPC ............ *A23N 12/10* (2013.01); *A47J 37/047* (2013.01); *F26B 11/02* (2013.01); *A47J 37/041* (2013.01)

(58) Field of Classification Search
CPC ....... A47J 37/041; A47J 37/047; F26B 11/02; F26B 11/04; F26B 11/08; A23N 12/10
USPC ...................... 99/427, 474; 34/108, 130, 602
See application file for complete search history.

(56) References Cited

U.S. PATENT DOCUMENTS

| | | | | |
|---|---|---|---|---|
| 3,296,711 A | * | 1/1967 | Langford | B01J 19/02 34/109 |
| 4,048,473 A | * | 9/1977 | Burkhart | A47J 27/004 219/389 |
| 4,147,924 A | * | 4/1979 | DeWitt, Jr. | A47J 36/2483 219/401 |
| 2006/0037211 A1 | * | 2/2006 | Herren | A47J 43/24 34/108 |

FOREIGN PATENT DOCUMENTS

JP   101257328 A1 * 11/2012  ............. A23N 12/10

* cited by examiner

*Primary Examiner* — Reginald Alexander
(74) *Attorney, Agent, or Firm* — Bacon & Thomas, PLLC (57) ABSTRACT

A heat-transforming ceramic roasting cylinder and a coffee bean roaster using the same are provided. The ceramic roasting cylinder is made by grinding and mixing ball clay, kaolin clay, mullite, spodumene, and an energy ceramic material into a clay blank; molding the clay blank into ceramic green bodies; and sintering the ceramic green bodies at 1250~1320° C. for 18~24 hours. The ceramic roasting cylinder has an internal roasting space where coffee beans are loaded. The ceramic roasting cylinder also has evenly distributed capillary pores through which heat can circulate to induce the energy ceramic material in the roasting cylinder to release negative ions and far-infrared rays. The far-infrared rays can reduce the van der Waals forces between the oil molecules in the coffee beans instantly, splitting large oil molecules into smaller ones, ensuring the oil in the beans are released sufficiently, evenly, and rapidly to the vicinity of the bean surface.

24 Claims, 8 Drawing Sheets

HEAT-TRANSFORMING CERAMIC ROASTING CYLINDER AND COFFEE BEAN ROASTER USING THE SAME

FIELD OF THE INVENTION

The present invention relates to a roasting cylinder and more particularly to a ceramic roasting cylinder made of ball clay, kaolin clay, mullite, spodumene, and an energy ceramic material so as to release far-infrared energy.

BACKGROUND OF THE INVENTION

Figure 1:
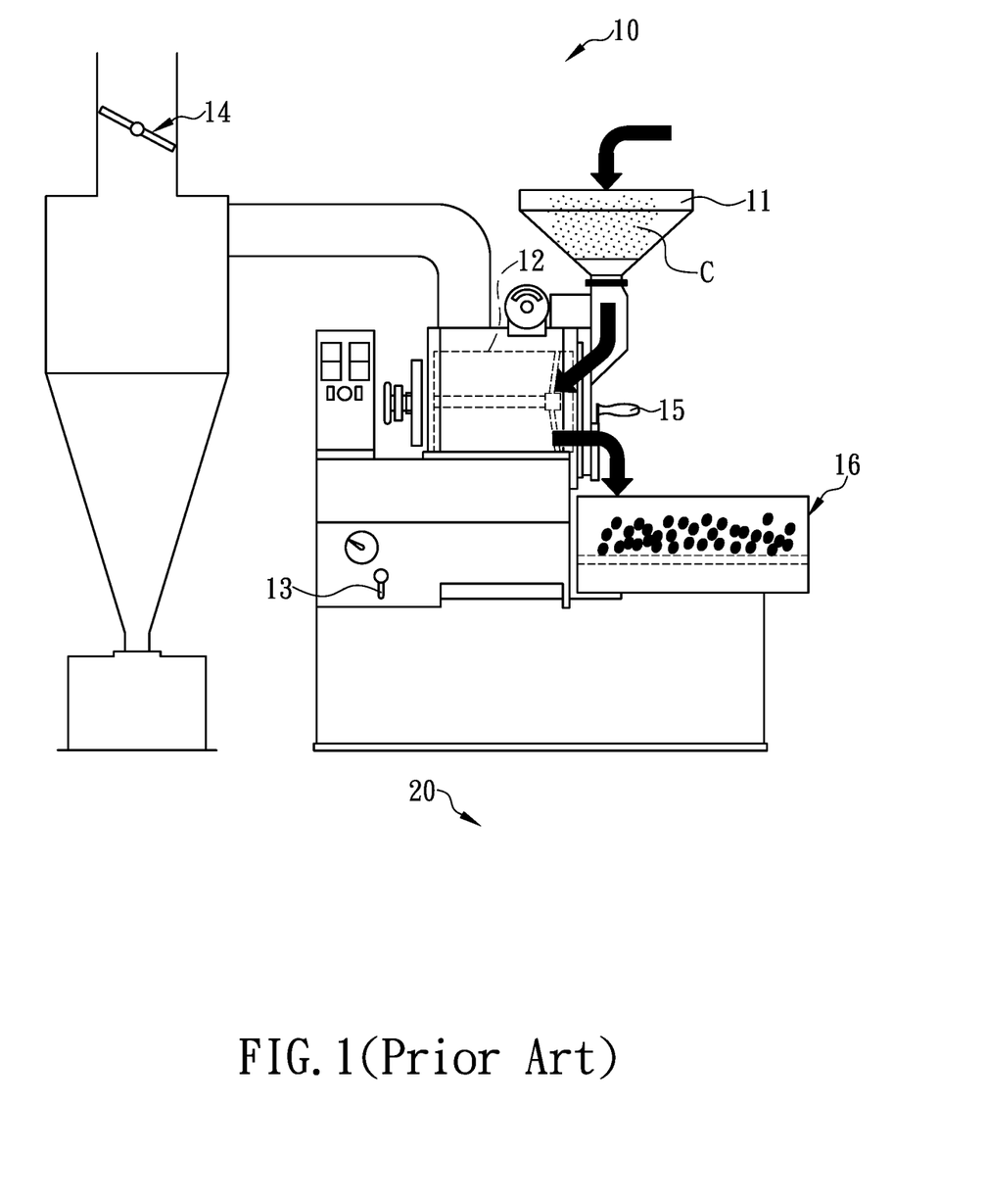
FIG. 1 is a schematic sectional view of a conventional commercial coffee bean roaster.

Green coffee beans of the same batch but roasted by different suppliers or shops tend to smell strikingly different or produce drinks of markedly different tastes. Obviously, the steps and equipment of "roasting" have certain effect on the flavor of the roasted beans and the drinks prepared therefrom. The existing roasting steps are briefly described below with reference to FIG. 1:

1. Bean selection: Before roasting the coffee beans C, it is necessary to pick out and remove therefrom all the beans that may have adverse effect on the resulting roasted beans (e.g., those partially eaten by insects).

2. Getting ready: The selected coffee beans C to be roasted are placed in a standby area 20, which is typically beside a roaster 10.

3. Bean feeding: Once the roasting cylinder 12 of the roaster 10 is preheated to the predetermined temperature, the selected coffee beans C in the standby area are poured into a hopper 11, through which the beans enter the roasting cylinder 12.

4. Heat absorption: The coffee beans C in the roasting cylinder 12 begin to absorb heat.

5. Ignition and heating: The person in charge of roasting turns on a gas burner switch 13 to heat the roasting cylinder 12. The heat of the burner and the extent to which an air valve 14 is opened can be adjusted according to roasting requirements.

6. Waiting for the first crack: The coffee beans C heated in the roasting cylinder 12 will undergo the first crack when the temperature in the roasting cylinder 12 reaches about 200° C. Before that, the person in charge of roasting can evaluate the degree of roast of the coffee beans C by means of a sample spoon 15 at the front of the roaster and, if necessary, finetune the gas burner switch 13 and the air valve 14 accordingly.

7. Opening the air valve 14 in a timely manner: Based on the roasting condition, the air valve 14 is opened to discharge the chaff, or better known as silver skin, of the green coffee beans. Overheated chaff generates an undesirable smoky smell and will compromise the flavor of the resulting coffee.

8. Bean discharge: The timing of discharging the roasted coffee beans is critical to the flavor, characteristics, and water content of the beans. The roasted coffee beans C are released onto a table in the cooling tank 16.

9. Cooling: The scalding coffee beans C are allowed to cool down on the table in the cooling tank 16.

10. Bean reselection: Beans that are broken during the roasting process are picked out and removed from the coffee beans C.

Each of the roasting steps described above may be performed differently from one roasted coffee bean supplier to another, depending on the preferences, knowledge, and experience of those who oversee the roasting process, and all such differences have direct or indirect effect on the flavor of coffee. As a matter of fact, however, the flavor of coffee generally known to or perceived by the public depends entirely on the degree of roast; that is to say, the timing of ignition, the heating temperature, and the heating duration directly determine the roasting result. In other words, the degree of roast has been viewed as the most important factor in the flavor of a cup of coffee.

Figure 2A:
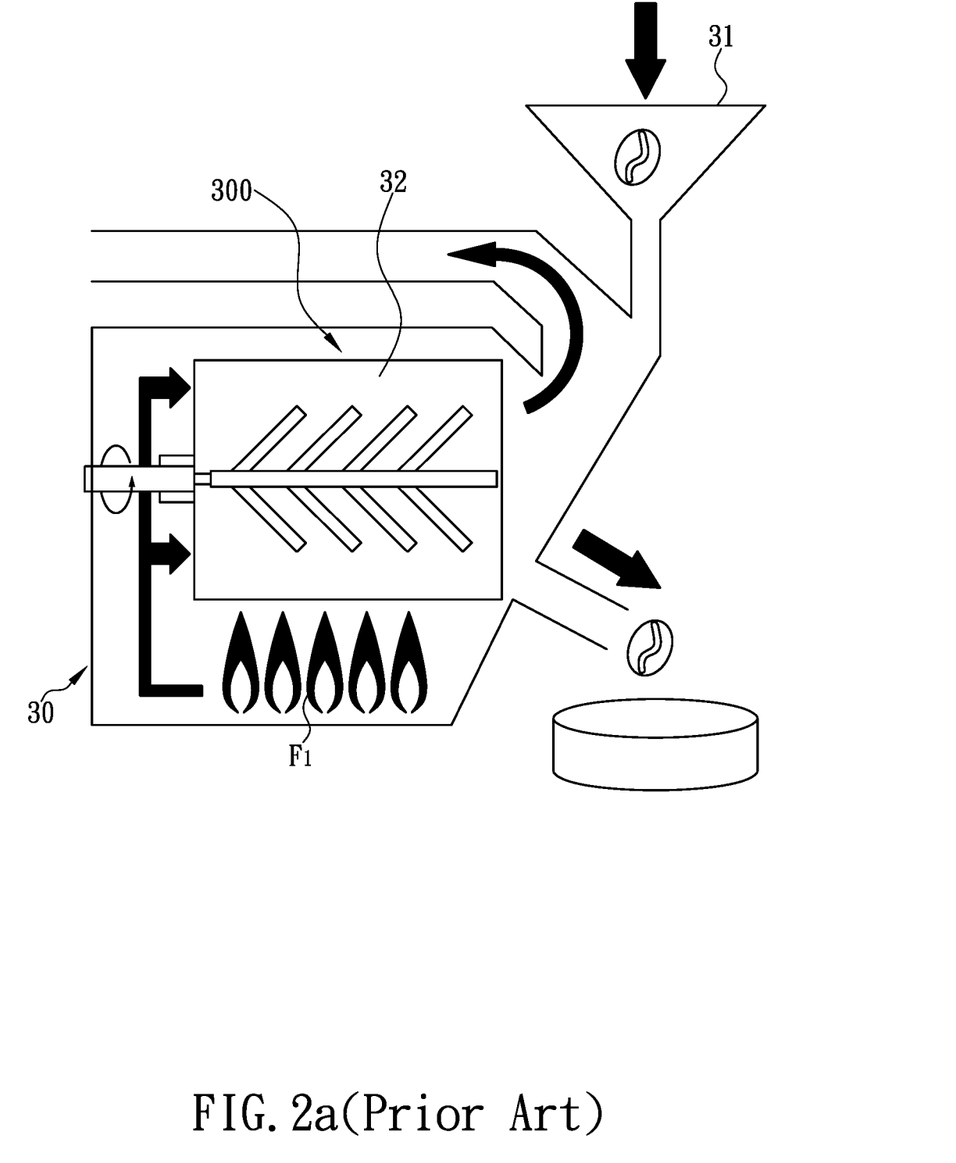
FIG. 2a is a schematic structural diagram of a conventional half-hot-air/direct-flame coffee bean roaster.
Figure 2B:
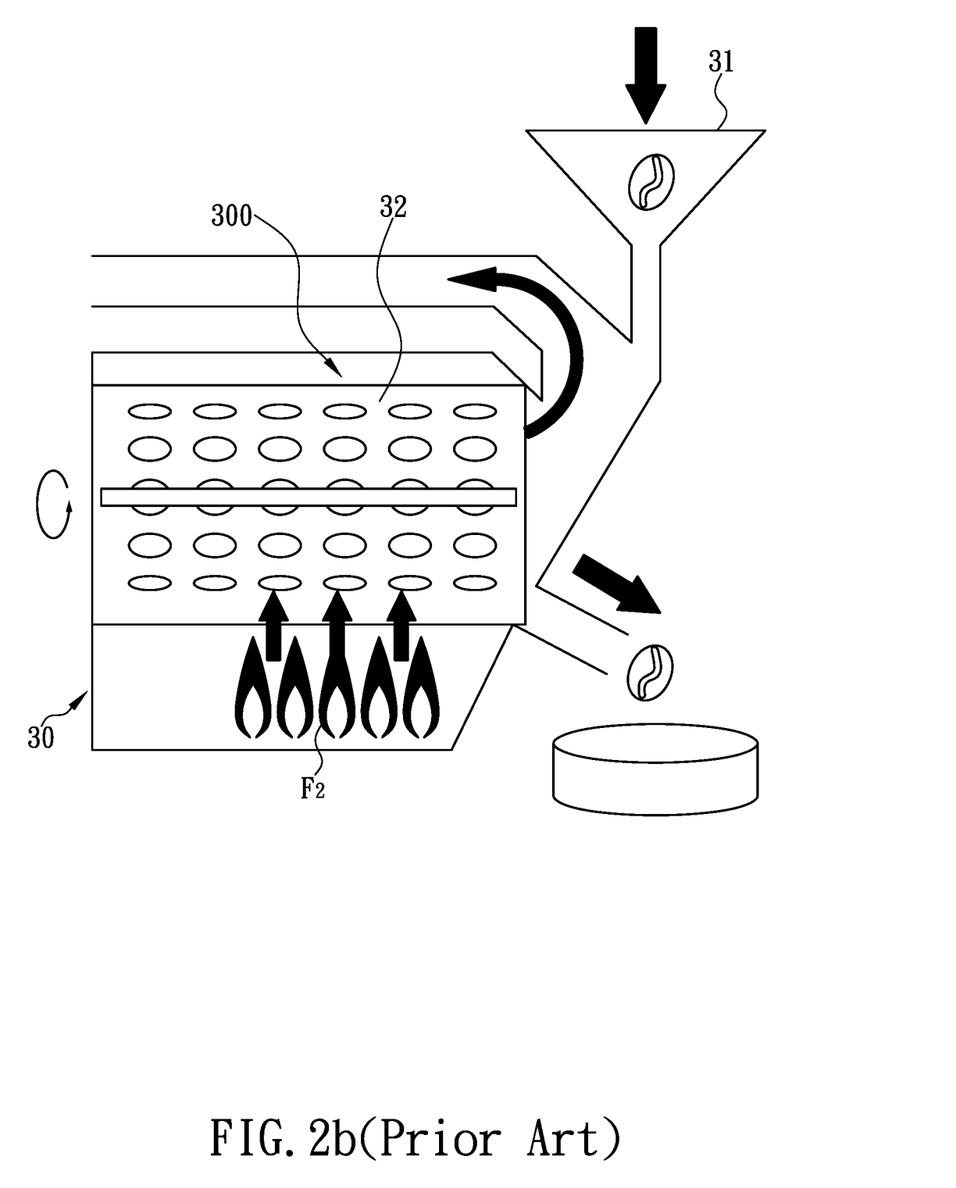
FIG. 2b is a schematic structural diagram of a conventional direct-flame coffee bean roaster.
Figure 2C:
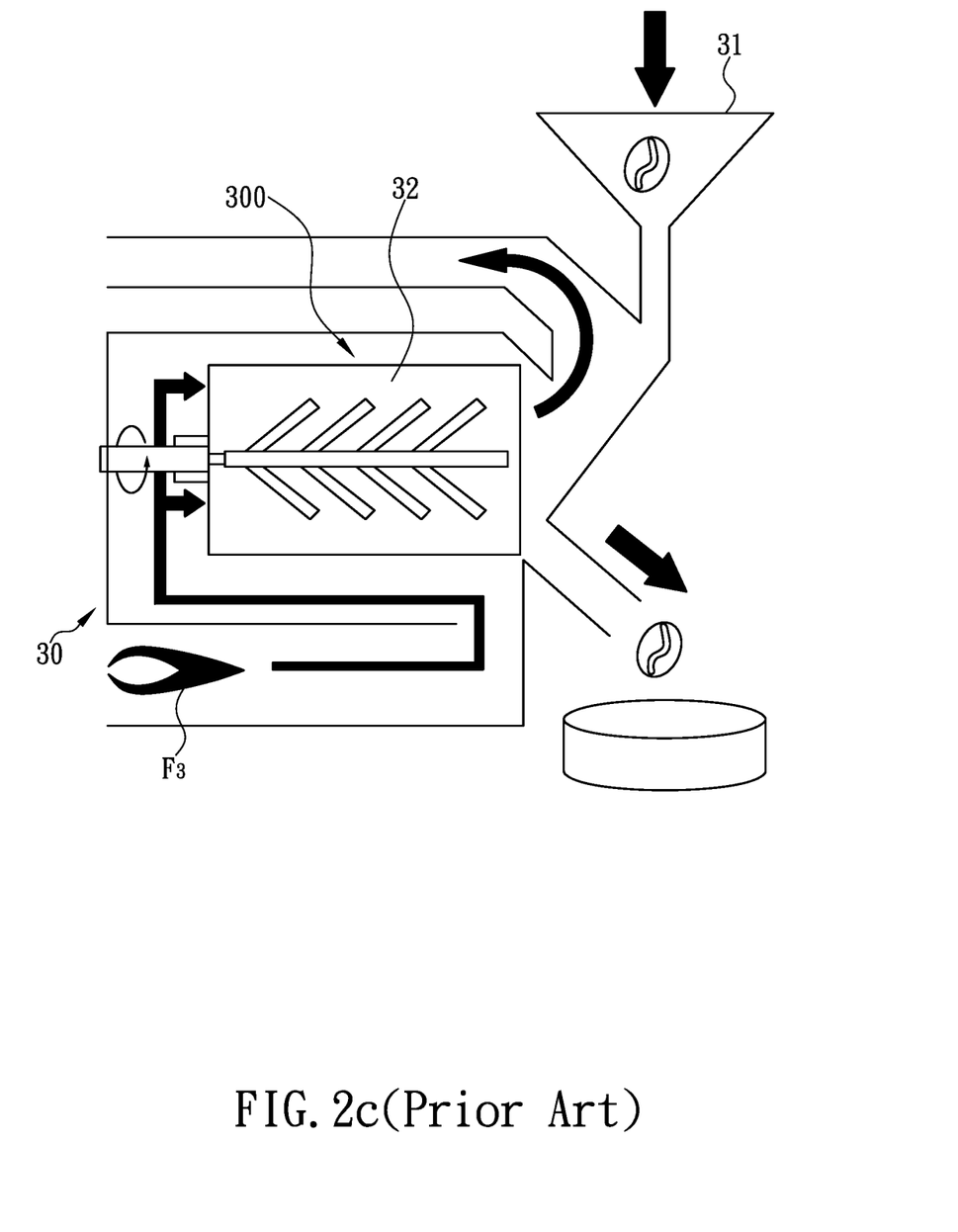
FIG. 2c is a schematic structural diagram of a conventional hot-air coffee bean roaster.

According to the above, the quality of coffee as a drink hinges on the roasting process of coffee beans, And because of that, a variety of advanced coffee bean roasters have been imported to Taiwan from abroad (e.g., the United States, Germany, Italy, Spain, Turkey, Japan, Korea, and China). Many local companies have also dedicated themselves to the development and manufacture of coffee bean roasters. Take some common types of coffee bean roasters on the market for example. Each coffee bean roaster 30 in FIG. 2*a*, FIG. 2*b*, and FIG. 2*c* is provided with a hopper 31 and an internal receiving space 300, where a roasting cylinder 32 is installed. The roasting space (not shown) in each roasting cylinder 32 is in communication with the corresponding hopper 31 so that green coffee beans be fed into the roasting space through the corresponding hopper 31 in order to be heated and roasted. With continued reference to FIG. 2*a*, FIG. 2*b*, and FIG. 2*c*, the roasting cylinder 32 in each coffee bean roaster 30 is typically made of stainless steel or a cast iron alloy, and their heating methods can be respectively identified as half hot air/direct flame (FIG. 2*a*), direct flame (FIG. 2*b*), and hot air (FIG. 2*c*), depending on the way each heat source $F_1$, $F_2$, or $F_3$ heats the corresponding roasting cylinder 32. The direct-flame heating method refers to heating a roasting cylinder 32 directly with the corresponding heat source, whereas the hot-air heating method refers to heating a roasting cylinder 32 through hot air generated by the corresponding heat source, i.e., indirectly. Regardless of the heating and roasting method employed, however, it is difficult for any of the coffee bean roasters 30 to keep coffee beans in the optimal heated or roasted state, and in consequence the roasted coffee beans are often heated unevenly. More specifically, the roasted coffee beans may be burned and carbonized on the outside but remain green inside, which phenomenon hinders the oil in the coffee beans from being released sufficiently and evenly, and hence from bringing out the optimal and most natural aroma and flavor of the beans, which is truly a shame.

While discussing the degree of roast, it is imperative to know what "roasting" is in relation to coffee beans. Roasting in this regard refers to heating and frying green coffee beans until the beans are charred on the surface to the desired degree. This description, however, is only superficial. The ultimate goal of roasting coffee beans is to maximize the characteristics of each kind of green coffee beans by finding out their unique degree of roast and stopping the frying or roasting process as soon as that degree is reached; only by doing so can the best drinking quality of each type of coffee be attained. Generally, the optimal degree of roast of each kind of coffee beans depends on the species of the beans and cannot be determined without repeated practice, inspection, and sampling. Nevertheless, all the commercially available coffee bean roasters 30 shown in FIG. 2*a*, FIG. 2*b*, and FIG. 2*c* use metal roasting cylinders 32 that are heated directly or indirectly to roast the coffee beans therein and that therefore may lead to a loss of oil, and hence of the best and most natural flavor, from beans that are dried out by the high temperature in the coffee bean roasters 30. Moreover, the high temperature of the coffee bean roaster 30 using the direct-flame roasting method is very likely to burn the green coffee beans being roasted. Should that happen, the oil in the coffee beans will be carbonized under the high temperature or even transformed into compounds that are harmful to the human body. This, too, is a major drawback of the conventional coffee bean roasters 30 and the existing roasting techniques.

It is an important issue for the coffee bean roaster industry, which is also the issue to be addressed by the present invention, to develop a roasting cylinder configured for a coffee bean roaster and capable of distributing the thermal energy in the coffee bean roaster precisely and evenly without increasing the power consumption or operation time of the coffee bean roaster, so as to rapidly and precisely produce roasted coffee beans whose natural aroma are well preserved and which are free of the bitterness of burning or carbonization, allowing consumers to enjoy affordable, high-quality, and healthy coffee.

BRIEF SUMMARY OF THE INVENTION

One objective of the present invention is to provide a heat-transforming ceramic roasting cylinder. The ceramic roasting cylinder is made by providing ball clay, kaolin clay, mullite, spodumene, and an energy ceramic material in predetermined ratios; grinding and mixing the aforesaid ingredients into a clay blank; molding the clay blank into at least one ceramic green body; and sintering the ceramic green body at 1250~1320° C. for 18~24 hours. The ceramic roasting cylinder is installed in a receiving space in a coffee bean roaster, has an internal roasting space, and is configured to heat, stir, and roast the coffee beans loaded in the roasting space. The ceramic roasting cylinder also has a plurality of capillary pores distributed evenly over the ceramic roasting cylinder so that thermal energy can circulate repeatedly from inside the ceramic roasting cylinder to the outside or vice versa through the capillary pores due to a temperature difference, thereby inducing the energy ceramic material in the ceramic roasting cylinder to release negative ions and far-infrared rays. The far-infrared rays can reduce the van der Waals forces between the oil molecules of the oil in the coffee beans instantly, thereby breaking large oil molecules into smaller ones, ensuring that the oil in the coffee beans will be released sufficiently, evenly, and rapidly to those parts of the coffee beans that are adjacent to the bean surface, rather than be burned or carbonized during the roasting process. Accordingly, the ceramic roasting cylinder not only allows the coffee beans roasted therein to retain their natural healthy flavor and strong aroma, but also helps save the time and energy required for roasting, thus reducing carbon dioxide emissions and contributing to environmental protection.

More specifically, while the ceramic roasting cylinder stirs and roasts the coffee beans loaded in its internal roasting space, thermal energy can circulate continuously between the inner and outer wall surfaces of the ceramic roasting cylinder through the capillary pores distributed evenly over those wall surfaces due to a difference in temperature, allowing the energy mineral and metal oxide in the ceramic roasting cylinder to release negative ions and far-infrared rays in response to the continuous circulation of thermal energy and its interaction with the high temperature in the roasting space. The far-infrared rays can resonate with, and hence instantaneously reduce the van der Waals forces between, the oil molecules of the oil in the coffee beans, thereby splitting large oil molecule clusters into smaller ones, allowing the contaminants and impurities harbored in those large oil molecule clusters to be removed; thus, the oil is effectively purified and has its service life extended two- to threefold. The relatively small oil molecule clusters also increase the heat-absorbing area of the coffee beans substantially, so the coffee beans can be heated faster and more evenly. To be specific, the time required for roasting can be effectively shortened by 10%~25%. Moreover, the relatively small oil molecule clusters can be released rapidly and evenly to those parts of the coffee beans that are close to the bean surface, allowing the coffee beans to better present their unique, natural, and strong aroma than when a conventional roasting cylinder is used. In short, the ceramic roasting cylinder can purify the oil in the coffee beans, extend the shelf life of the roasted coffee beans, and reduce the time and energy required for roasting. All these features not only contribute to reducing carbon dioxide emissions and therefore to environmental protection, but also enhance the safety and healthiness of coffee as a drink.

Another objective of the present invention is to provide a coffee bean roaster that includes a receiving space, a drive motor, a ceramic roasting cylinder, and a heat source. The receiving space is formed in the coffee bean roaster. The drive motor is mounted in the coffee bean roaster. The ceramic roasting cylinder is rotatably installed in the receiving space, has an internal roasting space, and is configured to stir and roast the coffee beans loaded in the roasting space. The ceramic roasting cylinder further has a central shaft connected to and rotatable with the drive motor. The heat source is provided in the coffee bean roaster and corresponds in position to the receiving space, the ceramic roasting cylinder, or the roasting space in order to release thermal energy toward, and thereby heat, the coffee beans in the roasting space and the ceramic tubes, columns, or plates of the ceramic roasting cylinder. The ceramic tubes, columns, or plates are made by grinding mullite (which constitutes 20%~40% by weight of the ceramic tubes, columns, or plates), spodumene (which constitutes 25%~45% by weight of the ceramic tubes, columns, or plates), and an energy ceramic material capable of generating far-infrared rays (which constitutes 10%~30% by weight of the ceramic tubes, columns, or plates) separately into particles; blending those particles with ball clay (which constitutes 10%~25% by weight of the ceramic tubes, columns, or plates) and kaolin clay (which constitutes 15%~30% by weight of the ceramic tubes, columns, or plates); mixing until a homogeneous clay blank is obtained; using a mold to shape the clay blank into tubular, columnar, or plate-like ceramic green bodies; sintering the ceramic green bodies at 1250~1320° C. for 18~24 hours; and cooling the sintered products to obtain the ceramic tubes, columns, or plates. The ceramic tubes, columns, or plates of the ceramic roasting cylinder can transform the heat source directly into a radiation heat source rich in negative ions and far-infrared rays so that each roasted coffee bean is heated evenly throughout, without having a burned or carbonized surface or losing its distinctive flavor. The coffee bean roaster is therefore capable of producing roasted coffee beans that better present their unique, natural, and strong aroma than those produced by a conventional roaster, and of preserving the intrinsic flavor of coffee beans while effectively preventing the oil in the coffee beans from carbonizing and hence from forming harmful substances under the high roasting temperature. Consequently, the safety and healthiness of coffee as a drink are ensured.

BRIEF DESCRIPTION OF THE SEVERAL VIEWS OF THE DRAWINGS

The structural features, manufacturing process, and objectives of the present invention can be better understood by referring to the following detailed description in conjunction with the accompanying drawings, in which.

DETAILED DESCRIPTION OF THE INVENTION

Seeds for human consumption (e.g., soybeans, ginkgo seeds, coffee beans, cocoa beans, peanuts, almonds, and various other nuts) contain oils whose molecule clusters tend to gather together because of the van der Waals forces therebetween, foaming relatively large oil molecule clusters. These relatively large oil molecule clusters not only may harbor contaminants and impurities, but also result in a reduced heat-absorbing area, preventing the seeds from being heated evenly. That is to say, heat is likely to accumulate in a specific portion of a heated seed rather than permeate the entire seed. In particular, while such seeds are being roasted, it is difficult for the relatively large oil molecule clusters to seep evenly to those areas of the seeds that are adjacent to the seed surface; consequently, oil is concentrated in certain parts of the roasted seeds, creating an oily and less crunchy mouthfeel.

In view of the above, and based on his ample experience, professional knowledge, and profound insight in the field of seed roasting techniques and equipment, the inventor of the present invention has found that the key to a successful roast of edible seeds resides in the use of thermal energy. As is well known in the art, a master of cooking or roasting is a master at controlling the heat. Whether the heat source can be precisely controlled to work evenly and effectively determines the quality of a roast. The inventor has also found that part of the thermal energy of far-infrared rays, which have been studied extensively for nearly a hundred years, can be easily absorbed by an object receiving the rays, thereby raising the temperature of the object rapidly; this is why far-infrared rays have been used to warm the human body and treat related diseases. More particularly, the region of the far-infrared spectrum that has the greatest wavelengths provides the mildest increase in temperature by supplying energy that can be well absorbed by cells and tissues and transmitted efficiently to areas other than where the rays are targeted. The inventor, therefore, came up with the idea of roasting edible seeds by warming them from the inside out so that the optimal roasting effect of heating the seeds throughout without burning or carbonizing the seed surface can hopefully be achieved.

According to the above, the inventor of the present invention created a ceramic roasting cylinder made with mineral/metal elements and a ceramic material that is resistant to high temperatures. The ceramic roasting cylinder is intended to make the most of its heat accumulating and radiating properties so as to rapidly transform the thermal energy received from an external heat source into thermal radiation rich in negative ions and far-infrared rays. The thermal radiation is used to heat and roast the coffee beans in the ceramic roasting cylinder to the optimal degree, ensuring that the roasted coffee beans are evenly heated throughout without being burned or carbonized on the surface and can therefore precisely maintain their natural healthy flavor and rich aroma.

Figure 3:
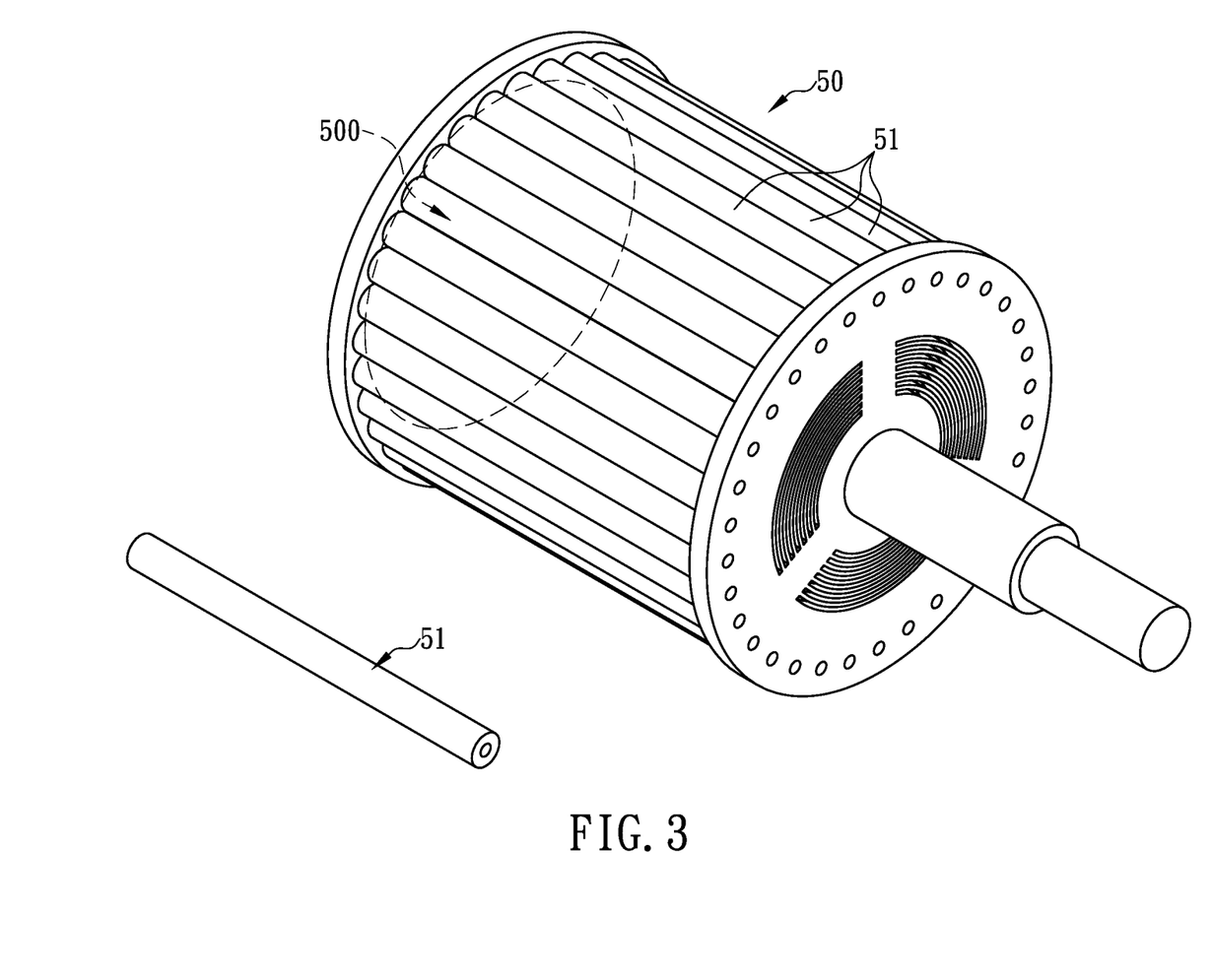
FIG. 3 is a perspective view of the ceramic roasting cylinder according to a preferred embodiment of the present invention.

The present invention provides a heat-transforming ceramic roasting cylinder and a coffee bean roaster using the same. Referring to FIG. 3, the ceramic roasting cylinder 50 is configured to be installed in a coffee bean roaster (not shown) in a rotatable manner and is made by providing ball clay, kaolin clay, mullite, spodumene, and an energy ceramic material in predetermined ratios; grinding and mixing the aforesaid ingredients into a clay blank; molding the clay blank into at least one ceramic green body; and then sintering the ceramic green body at 1250~1320° C. for 18~24 hours. The ceramic roasting cylinder 50 is formed therein with a roasting space 500, where coffee beans can be loaded in order to be stirred, heated, and roasted by the ceramic roasting cylinder 50. The ceramic roasting cylinder 50 has a plurality of capillary pores distributed evenly over the inner and outer wall surfaces of the cylinder so that thermal energy can circulate repeatedly from outside the ceramic roasting cylinder 50 to the internal roasting space 500 or vice versa through the capillary pores due to a difference in temperature. The circulating thermal energy will interact with the high temperature in the roasting space 500, thereby inducing the energy ceramic material in the ceramic roasting cylinder 50 to release negative ions and far-infrared rays. The far-infrared rays can reduce the van der Waals forces between the oil molecules of the oil in coffee beans instantly such that large oil molecules are broken down to smaller ones, ensuring that the oil in the coffee beans will seep sufficiently, evenly, and rapidly to those areas of the coffee beans that are adjacent to the bean surface, rather than be burned or carbonized during the roasting process. This not only allows the roasted coffee beans to precisely retain their natural healthy flavor and strong aroma, but also significantly reduces the time and energy required for roasting; as a result, carbon dioxide emissions can be reduced to help protect the environment.

In this preferred embodiment of the present invention, with continued reference to FIG. 3, the ceramic roasting cylinder 50 is a hollow cylindrical body composed of a plurality of ceramic tubes (or columns or plates) 51 connected sequentially along the circumference of the cylindrical body such that the roasting space 500, in which coffee beans can be loaded in order to be stirred and roasted, is formed in the ceramic roasting cylinder 50. In this preferred embodiment, the ceramic tubes (or columns or plates) 51 are made by the following steps (with reference to FIG. 4) and then put together to complete the ceramic roasting cylinder 50.

Figure 4:
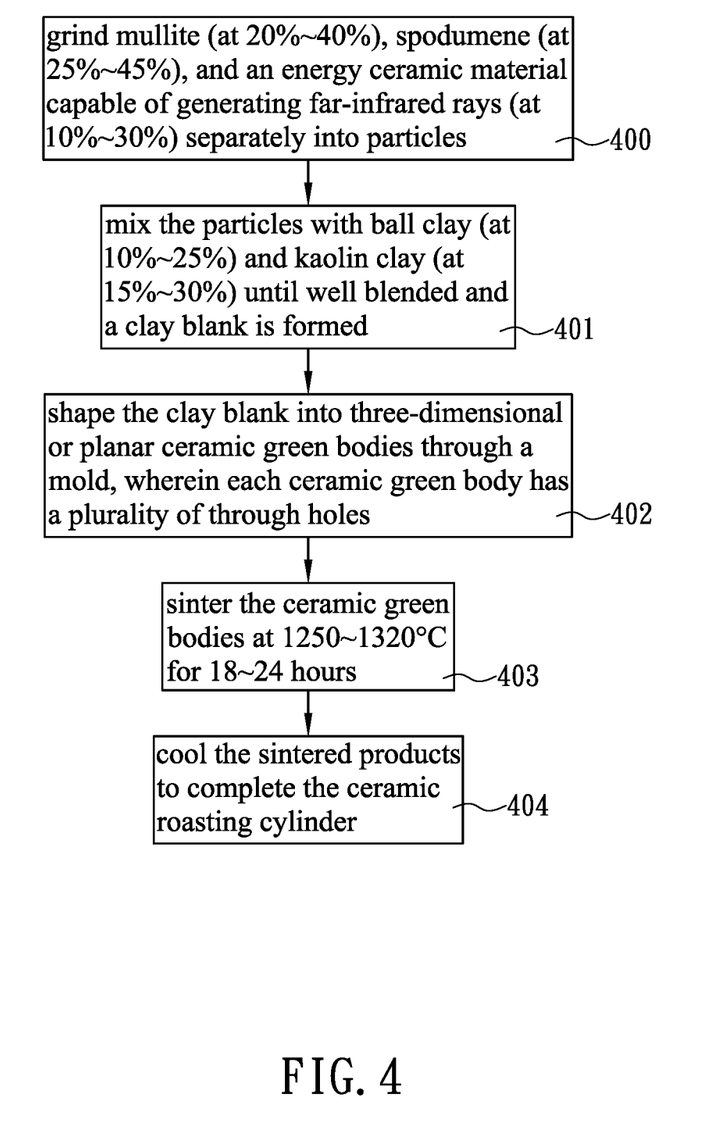
FIG. 4 is a flowchart of the manufacturing process of the ceramic roasting cylinder in FIG. 3.

(400) To begin with, mullite, which makes up 20%~40% of the total weight of the ceramic tubes (or columns or plates) 51; spodumene (or spodumenite), which makes up 25%~45% of the total weight of the ceramic tubes (or columns or plates) 51; and an energy ceramic material capable of generating far-infrared rays, which makes up 10%~30% of the total weight of the ceramic tubes (or columns or plates) 51, are separately ground into particles, whose particle sizes range from 50 μm to 400 μm. Mullite is an aluminum silicate resistant to high heat and featuring high strength, low thermal conductivity, and remarkable energy-saving effect. Moreover, mullite is a superior refractory material that can be brought into direct contact with flames. Here, mullite is used mainly to increase the structural strength of the ceramic tubes (or columns or plates) 51 in a high-temperature state and to effectively lower the heat-accumulating ability of the ceramic tubes (or columns or plates) 51 lest a large amount of heat accumulate therein. Spodumene is composed of $LiAl(SiO_3)_2$ or $Li_2O.Al_2O_3.4SiO_2$, is typically found in granite pegmatite rich in lithium, can coexist with tourmaline, and is highly transparent. Both mullite and spodumene are low-expansion materials capable of withstanding high temperatures. The energy ceramic material is composed of an energy mineral and a metal oxide. The energy mineral is a mixture at least of tourmaline, dolomite, and zirconium silicate and makes up 5%~25% of the total weight of the ceramic tubes (or columns or plates) 51, with tourmaline being the major ingredient. Tourmaline is a silicate that contains mostly boron but also such elements as aluminum, sodium, iron, magnesium, and lithium. Polar crystals of tourmaline contain more than ten trace elements, can generate electric ions on their own for a long time, and can release negative ions and far-infrared rays permanently. Dolomite has the chemical formula of $CaMg(CO_3)_2$, whose crystals are a carbonate of the trigonal crystal system. Here, dolomite is used mainly to provide alkali-based fire retardancy. More particularly, when dolomite is heated to (or sintered at) a temperature higher than 1000° C., the magnesium oxide therein will transform into periclase, and the calcium oxide therein, into crystals of a compact structure and high water resistance, thereby rendering the ceramic tubes (or columns or plates) 51 resistant to temperatures higher than 2000° C. Zirconium silicate has the chemical formula of $ZrSiO_4$, has stable chemical properties, and is resistant to high heat and highly transparent. The metal oxide is an iron oxide, cobalt oxide, manganese oxide, chromic oxide, thorium oxide, zirconium oxide, titanium oxide, copper oxide, or a mixture of the above and also makes up 5%~25% of the total weight of the ceramic tubes (or columns or plates) 51. Here, the metal oxide serves mainly as a catalyst for inducing the energy mineral in the ceramic tubes (or columns or plates) 51 to release negative ions and far-infrared energy in a high-temperature environment.

(401) The particles obtained from step (400) are added with ball day, which makes up 10%~25% of the total weight of the ceramic tubes (or columns or plates) 51, and kaolin clay, which makes up 15%~30% of the total weight of the ceramic tubes (or columns or plates) 51. Then, the three of them go through a mixing process until they are well blended and form a clay blank. Ball clay is composed of kaolinite and is a plastic clay mixed with quartz, mica, and organic impurities in certain percentages. Due to its high plasticity, ball clay is often used to improve the formability of blanks. In a clay blank, however, ball clay should be used only moderately. Kaolin clay is composed mainly of kaolinite-based clay minerals and is a common and very important clay in nature. Pure kaolin clay looks like white, smooth, and fluffy soil and has such desirable physical and chemical properties as high plasticity and high fire retardancy. The mixing process is carried out mechanically to blend the ingredients of the clay blank evenly and thereby enhance the physical and mechanical properties of the clay blank. More specifically, the mixing process includes four stages: addition, dispersion, blending, and plasticization, in that order. The four stages are intended to effectively achieve even distribution of each ingredient throughout the clay blank and to lower overall viscosity.

(402) The clay blank is shaped into three-dimensional ceramic green bodies by means of a mold.

(403) The ceramic green bodies are sintered at 1250~1320° C. for 18~24 hours to produce sintered products.

(404) The sintered products are cooled to complete the manufacture of the ceramic tubes (or columns or plates) 51.

The embodiment described above is only a preferred one of the present invention but is not restrictive of the technical features of the invention. If necessary, the clay blank can be directly molded into a hollow cylindrical ceramic green body; in that case, the ceramic roasting cylinder 50 is completed after the hollow cylindrical ceramic green body is sintered and cooled, i.e., the step otherwise required to put the ceramic tubes (or columns or plates) 51 together is eliminated. All such equivalent changes and modifications easily conceivable by a person skilled in the art who has read the technical contents disclosed herein should fall within the scope of patent protection sought by the applicant.

While coffee beans loaded in the roasting space 500 of the ceramic roasting cylinder 50 are being stirred and roasted, referring back to FIG. 3, the temperature difference between the inner and outer wall surfaces of the ceramic roasting cylinder 50 causes thermal energy to circulate repeatedly between those wall surfaces through the capillary pores distributed evenly over the wall surfaces and interact with the high temperature in the roasting space 500, thereby inducing the energy mineral and metal oxide in the ceramic roasting cylinder 50 to release negative ions and far-infrared rays. The far-infrared rays can resonate with, and thus immediately reduce the van der Waals forces between, the oil molecules of the oil in the coffee beans such that large oil molecule clusters are split into smaller ones. This allows the contaminants and impurities harbored in those large oil molecule clusters to be removed and the oil, effectively purified as a result. The purified oil does not deteriorate easily and may therefore have its service life extended two- to threefold. Moreover, as the relatively small oil molecule clusters lead to a significant increase of the heat-absorbing area of the coffee beans, faster and more even heating can be achieved. Not only can the roasting time be effectively shortened by 10%~25%, but also the relatively small oil molecule clusters can be released more sufficiently, more rapidly, and more evenly to those pails of the coffee beans that are adjacent to the bean surface, allowing the coffee beans to present their unique, natural, and strong aroma and flavor. In a nutshell, the ceramic roasting cylinder 50 can effectively purify the oil in coffee beans, extend the shelf life of roasted coffee beans, and reduce the time and energy required for roasting. All these features not only contribute to reducing carbon dioxide emissions and hence to environmental protection, but also increase the safety and healthiness of coffee as a drink.

Figure 5:
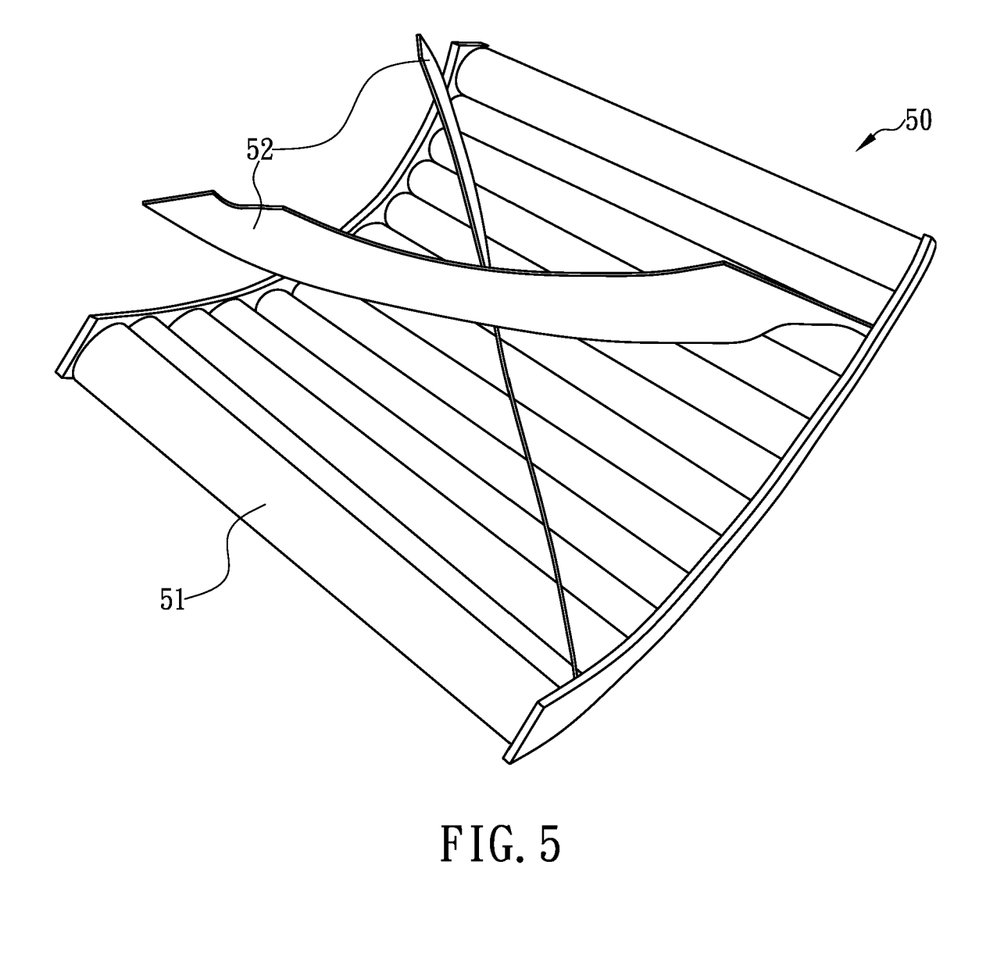
FIG. 5 is a perspective view showing the internal structure of the ceramic roasting cylinder in FIG. 3.

In this preferred embodiment of the present invention, referring to FIG. 5, the wall of the roasting space 500 of the ceramic roasting cylinder 50 is mounted with at least one stirring blade 52 extending diagonally in the roasting space 500. When the ceramic roasting cylinder 50 is rotated about its central shaft, the coffee beans in the roasting space 500 not only are rotated along with the ceramic roasting cylinder 50, but also are stirred by the stirring blades 52 and therefore roll in different directions. This allows the whole lot of coffee beans to be roasted evenly and consistently to the optimal degree.

Figure 6:
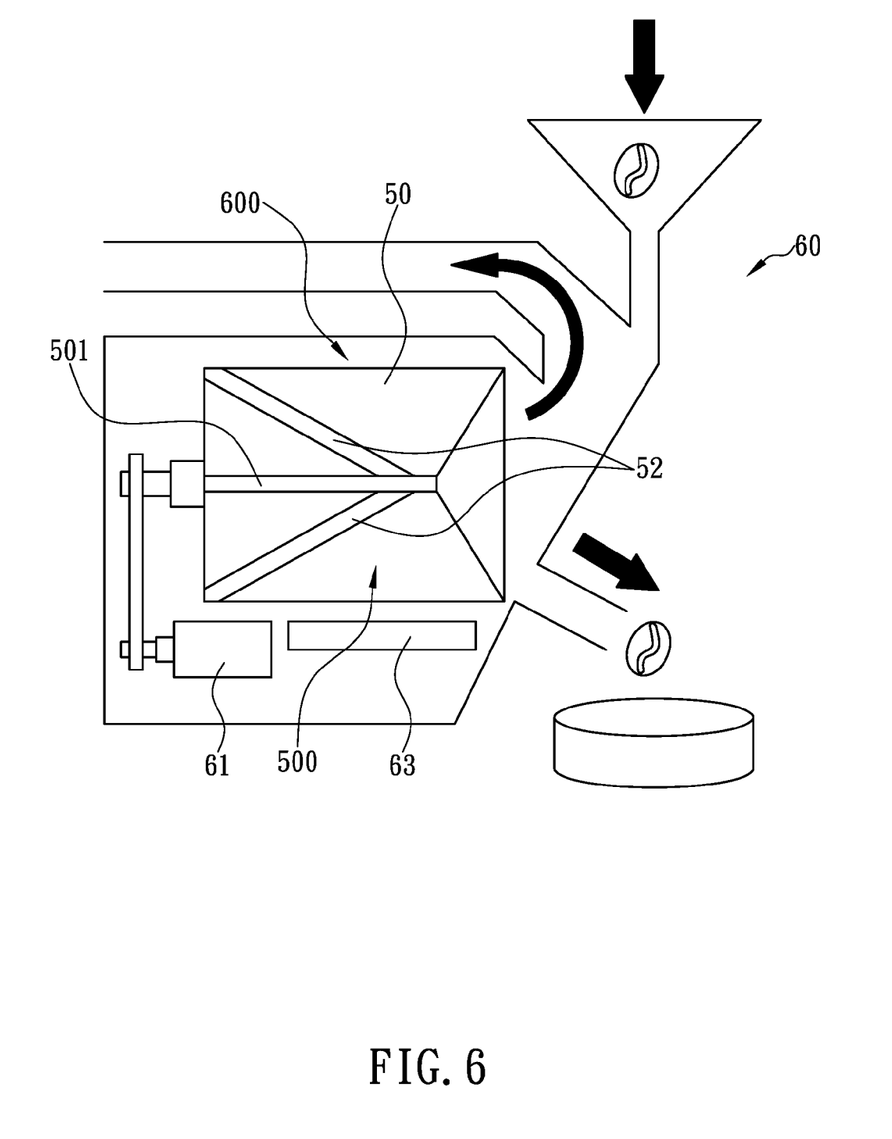
FIG. 6 schematically shows the internal structure of the coffee bean roaster according to another preferred embodiment of the invention.

Referring to FIG. 6, another preferred embodiment of the present invention provides a coffee bean roaster 60 capable for transforming a heat source into a radiation heat source. The coffee bean roaster 60 includes a receiving space 600, a drive motor 61, a ceramic roasting cylinder 50, and a heat source 63. The receiving space 600 is formed in the coffee bean roaster 60. The drive motor 61 is mounted in the coffee bean roaster 60. The ceramic roasting cylinder 50 is identical to its counterpart in the previous embodiment (see FIG. 3 and FIG. 5) and is rotatably installed in the receiving space 600 so that coffee beans can be loaded into the roasting space 500 in the ceramic roasting cylinder 50 and be stirred by the stirring blades 52 mounted on the wall of the roasting space 500. The central shaft 501 of the ceramic roasting cylinder 50 is connected to the drive motor 61 and can rotate with the drive motor 61. The heat source 63 is provided in the coffee bean roaster 60 and corresponds in position to the receiving space 600, the ceramic roasting cylinder 50, or the roasting space 500 in order to release thermal energy toward, and thereby heat, the coffee beans loaded in the roasting space 500 and the ceramic tubes (or columns or plates) 51 of the ceramic roasting cylinder 50. The ceramic tubes (or columns or plates) 51 are made by grinding mullite, which constitutes 20%~40% of the total weight of the ceramic tubes (or columns or plates) 51; spodumene, which constitutes 25%~45% of the total weight of the ceramic tubes (or columns or plates) 51; and an energy ceramic material capable of generating far-infrared rays, which constitutes 10%~30% of the total weight of the ceramic tubes (or columns or plates) 51, separately into particles; blending those particles with ball clay, which constitutes 10%~25% of the total weight of the ceramic tubes (or columns or plates) 51, and kaolin clay, which constitutes 15%~30% of the total weight of the ceramic tubes (or columns or plates) 51; mixing until a homogeneous clay blank is obtained; using a mold to shape the clay blank into tubular (or columnar or plate-like) ceramic green bodies; sintering the ceramic green bodies at 1250~1320° C. for 18~24 hours; and cooling the sintered products to obtain the ceramic tubes (or columns or plates) 51. The ceramic tubes columns or plates) 51 of the ceramic roasting cylinder 50 can directly transform the heat source 63 into a radiation heat source rich in negative ions and far-infrared rays so that each coffee bean roasted in the roasting space 500 will be heated evenly throughout without being burned or carbonized on the surface or losing its natural flavor. The resulting roasted coffee beans, therefore, can better maintain their distinctive, natural, and strong aroma and flavor than those produced by a conventional coffee bean roaster. In addition, the oil in the coffee beans is effectively kept from turning into harmful substances that may otherwise result from carbonization under the high roasting temperature; in other words, the coffee bean roaster 60 helps ensure the healthiness of coffee as a drink.

The foregoing embodiments are only some preferred ones of the present invention but are not restrictive of the technical features of the invention. Based on the technical contents disclosed herein, a person skilled in the art can apply the ceramic roasting cylinder and coffee bean roaster of the present invention to the roasting processes of other edible seeds without departing from the scope of the invention.

What is claimed is:

1. A heat-transforming ceramic roasting cylinder, to be installed in a coffee bean roaster in a rotatable manner, characterized in that:

the ceramic roasting cylinder is made by providing ball clay, kaolin clay, mullite, spodumene, and an energy ceramic material in predetermined ratios; grinding the ball clay, the kaolin clay, the mullite, the spodumene, and the energy ceramic material into particles; mixing the particles into a clay blank; shaping the clay blank into at least one ceramic green body through a mold; and sintering the ceramic green body at 1250~1320° C. for 18~24 hours;

the ceramic roasting cylinder is formed therein with a roasting space and is configured to stir, heat, and roast coffee beans loaded in the roasting space; and the ceramic roasting cylinder has a plurality of capillary pores distributed evenly over the ceramic roasting cylinder so that thermal energy is able to circulate repeatedly through the capillary pores from outside the ceramic roasting cylinder to the roasting space or vice versa due to a temperature difference and interact with high temperature in the roasting space, thereby inducing the energy ceramic material in the ceramic roasting cylinder to release negative ions and far-infrared rays, in order for the far-infrared rays to instantly reduce van der Waals forces between oil molecules of oil in the coffee beans and thus split large said oil molecules into smaller oil molecules, ensuring that the oil in each said coffee bean being roasted is not burned or carbonized but seeps sufficiently, evenly, and rapidly to a part of the coffee bean that is adjacent to a surface thereof.

2. The ceramic roasting cylinder of claim 1, wherein the ceramic roasting cylinder is a hollow cylindrical body composed of a plurality of ceramic tubes, columns, or plates connected sequentially along the circumference of the hollow cylindrical body; and the ceramic tubes, columns, or plates form the roasting space in the ceramic roasting cylinder in order for the coffee beans to be loaded, stirred, and roasted in the roasting space.

3. The ceramic roasting cylinder of claim 1, wherein the roasting space has a wall mounted with at least one stirring blade extending diagonally in the roasting space.

4. The ceramic roasting cylinder of claim 2, wherein the roasting space has a wall mounted with at least one stirring blade extending diagonally in the roasting space.

5. The ceramic roasting cylinder of claim 3, wherein the particles are of sizes ranging from 50 μm to 400 μm.

6. The ceramic roasting cylinder of claim 4, wherein the particles are of sizes ranging from 50 μm to 400 μm.

7. The ceramic roasting cylinder of claim 5, wherein the energy ceramic material is composed of an energy mineral, at 5%~25% by weight of the ceramic roasting cylinder, and a metal oxide, also at 5%~25% by weight of the ceramic roasting cylinder.

8. The ceramic roasting cylinder of claim 6, wherein the energy ceramic material is composed of an energy mineral, at 5%~25% by weight of the ceramic roasting cylinder, and a metal oxide, also at 5%~25% by weight of the ceramic roasting cylinder.

9. The ceramic roasting cylinder of claim 7, wherein the energy mineral is a mixture at least of tourmaline, dolomite, and zirconium silicate.

10. The ceramic roasting cylinder of claim 8, wherein the energy mineral is a mixture at least of tourmaline, dolomite, and zirconium silicate.

11. The ceramic roasting cylinder of claim 9, wherein the metal oxide is an iron oxide, cobalt oxide, manganese oxide, chromic oxide, thorium oxide, zirconium oxide, titanium oxide, copper oxide, or a mixture thereof.

12. The ceramic roasting cylinder of claim 10, wherein the metal oxide is an iron oxide, cobalt oxide, manganese oxide, chromic oxide, thorium oxide, zirconium oxide, titanium oxide, copper oxide, or a mixture thereof.

13. A coffee bean roaster, comprising:
a receiving space formed in the coffee bean roaster;
a drive motor mounted in the coffee bean roaster;
a ceramic roasting cylinder formed as a hollow cylindrical body, wherein the ceramic roasting cylinder is formed therein with a roasting space to be loaded with coffee beans, and the ceramic roasting cylinder has a central shaft connected to and rotatable with the drive motor; and
a heat source provided in the coffee bean roaster and corresponding in position to the receiving space, the ceramic roasting cylinder, or the roasting space in order to release thermal energy toward, and thereby heat, the coffee beans loaded in the roasting space and the ceramic roasting cylinder;
wherein the ceramic roasting cylinder is made by grinding mullite, at 20%~40% by weight of the ceramic roasting cylinder; spodumene, at 25%~45% by weight of the ceramic roasting cylinder; and an energy ceramic material capable of generating far-infrared rays, at 10%~30% by weight of the ceramic roasting cylinder, separately into particles; mixing all the particles with ball clay, at 10%~25% by weight of the ceramic roasting cylinder, and kaolin clay, at 5%~30% by weight of the ceramic roasting cylinder, until well blended and a clay blank is formed; shaping the clay blank into tubular, columnar, or plate-like ceramic green bodies through a mold; sintering the ceramic green bodies at 1250~1320° C. for 18~24 hours to produce sintered products; and cooling the sintered products to complete the ceramic roasting cylinder.

14. The coffee bean roaster of claim 13, wherein the ceramic roasting cylinder is a hollow cylindrical body composed of a plurality of ceramic tubes, columns, or plates connected sequentially along the circumference of the hollow cylindrical body; and the ceramic tubes, columns, or plates form the roasting space in the ceramic roasting cylinder in order for the coffee beans to be loaded, stirred, and roasted in the roasting space.

15. The coffee bean roaster of claim 13, wherein the roasting space has a wall mounted with at least one stirring blade extending diagonally in the roasting space.

16. The coffee bean roaster of claim 14, wherein the roasting space has a wall mounted with at least one stirring blade extending diagonally in the roasting space.

17. The coffee bean roaster of claim 15, wherein the particles are of sizes ranging from 50 μm to 400 μm.

18. The coffee bean roaster of claim 16, wherein the particles are of sizes ranging from 50 μm to 400 μm.

19. The coffee bean roaster of claim 17, wherein the energy ceramic material is composed of an energy mineral, at 5%~25% by weight of the ceramic roasting cylinder, and a metal oxide, also at 5%~25% by weight of the ceramic roasting cylinder.

20. The coffee bean roaster of claim 15, wherein the enemy ceramic material is composed of an energy mineral, at 5%~25% by weight of the ceramic roasting cylinder, and a metal oxide, also at 5%~25% by weight of the ceramic roasting cylinder.

21. The coffee bean roaster of claim 19, wherein the energy mineral is a mixture at least of tourmaline, dolomite, and zirconium silicate.

22. The coffee bean roaster of claim 20, wherein the energy mineral is a mixture at least of tourmaline, dolomite, and zirconium silicate.

23. The coffee bean roaster of claim 21, wherein the metal oxide is an iron oxide, cobalt oxide, manganese oxide, chromic oxide, thorium oxide, zirconium oxide, titanium oxide, copper oxide, or a mixture thereof.

24. The coffee bean roaster of claim 22, wherein the metal oxide is an iron oxide, cobalt oxide, manganese oxide, chromic oxide, thorium oxide, zirconium oxide, titanium oxide, copper oxide, or a mixture thereof.

* * * * *